March 13, 1934.  E. G. GUNN  1,950,886
VIBRATION DAMPENER FOR CRANK SHAFTS
Filed June 10, 1929
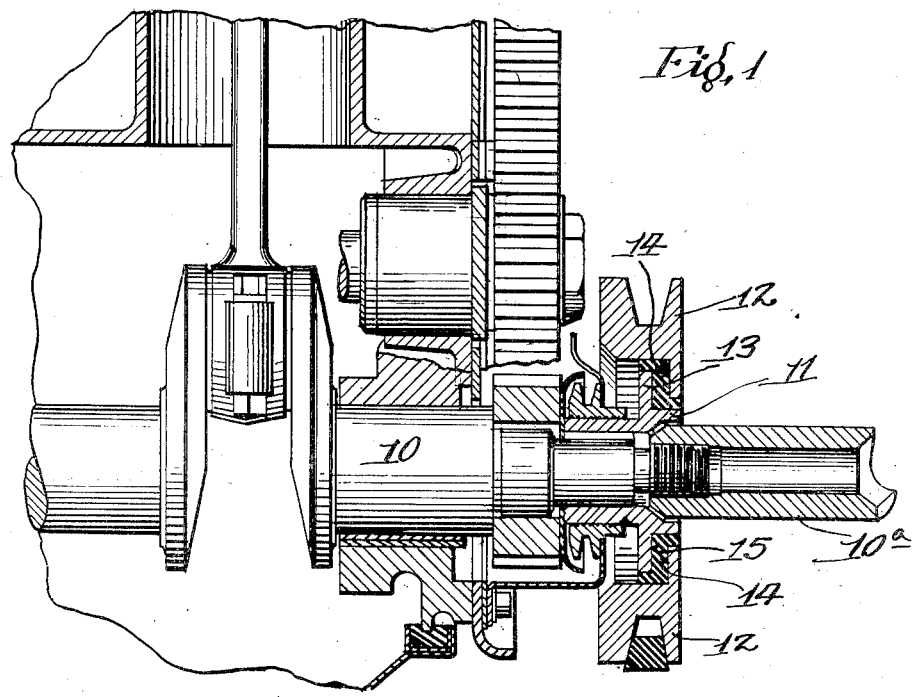
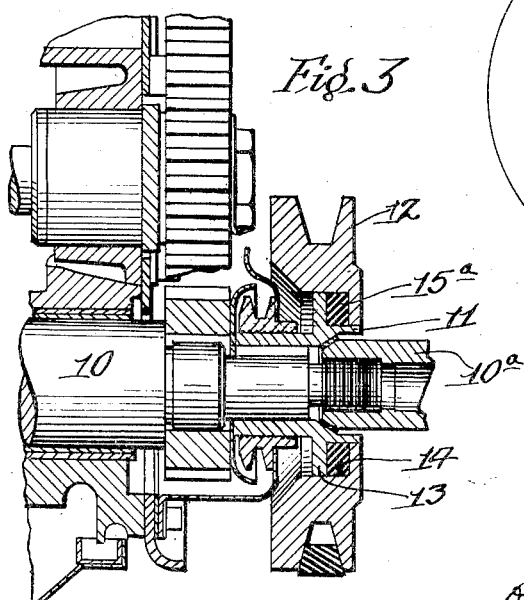
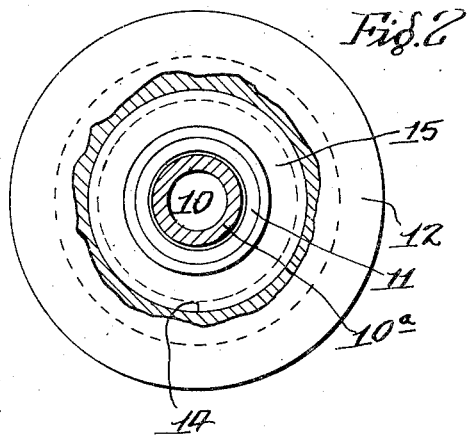
Inventor
Earl G Gunn
Offield Tohlhope Paal & Poole
Attorneys Patented Mar. 13, 1934

1,950,886

UNITED STATES PATENT OFFICE 1,950,886

VIBRATION DAMPENER FOR CRANK SHAFTS

Earl G. Gunn, Racine, Wis., assignor, by mesne assignments, to Packard Motor Car Company, Detroit, Mich., a corporation of Michigan Application June 10, 1929, Serial No. 369,763

4 Claims. (Cl. 74—6)

This invention relates to improvements in vibration dampeners for crank shafts of internal combustion motors, and has for its principal object to provide an improved construction for devices of the character described.

Various constructions have heretofore been proposed and utilized for yieldingly mounting a fly wheel on a crank shaft in order to minimize the effects of excessive vibrations at certain speeds, usually ascribed to the coupling of natural periods of vibration of certain moving parts of the motor. Most of these constructions, however, depend in whole or in part upon yielding frictional engagement between the fly wheel and its crank shaft, and furthermore are more or less complicated, requiring a relatively large number of parts.

In carrying out my present invention, I provide an improved and simplified construction wherein the yielding or dampening action is wholly effected through an elastic connection, preferably rubber, so as to make use of the relatively great flexibilty or elasticity of rubber under initial or small loads, and the relatively greater resistance to movement as the load increases.

The invention may best be understood by reference to the accompanying drawing, in which Figure 1 is a fragmentary sectional view of a motor taken axially of the crank shaft, to which crank shaft my invention has been applied.

Figure 2 is a front view of the crank shaft and flywheel shown in Figure 1, with parts of the face of the flywheel broken away.

Figure 3 is a view similar to Figure 1, but showing a modified form of my invention.

Referring to details of the embodiment of my invention illustrated in the drawing, the crank shaft is indicated at 10 and is provided with a hub 11 on which an inertia member or flywheel 12 is yieldably mounted to permit limited rotation of said flywheel relative to said crank shaft. The hub is secured on the crank shaft by suitable means, such as a sleeve 10a, herein the starting crank connection, threaded on the end of the crank shaft.

In the form shown in Figure 1, the hub 11 is provided with a flanged portion 13 while the flywheel is provided with an annular recess 14 somewhat larger in diameter than said flanged portion. The two members mentioned are spaced apart by a substantial thickness of rubber 15 forming a ring which is secured in place between them, preferably by vulcanizing the rubber to both adjacent metallic surfaces of the flywheel and hub. This process of vulcanizing rubber to metallic surfaces is well known in the art and need not be described herein in detail.

A modified form of the invention is shown in Figure 3 in which the recess 14 in the flywheel has only a working clearance around the margin of the flanged portion 13 of the hub, and the vulcanized rubber ring 15a is substantially rectangular in cross section, as clearly shown. However, the rotational yielding action is the same in both forms.

The construction above described provides a particularly simple and economical arrangement for the intended purpose. The rubber part 15 forming a ring forms the sole yielding support for the flywheel on its crank shaft. As is well known, rubber does not follow Hooke's law, but affords relatively great deflection under initial and small loads, but the resistance increases more rapidly under heavier loads. Thus in the construction of the invention, the relatively large initial elasticity of the rubber is utilized to afford a comparatively large initial deflection of the flywheel relative to the crank shaft thus giving greater efficiency in operation than is afforded by ordinary friction or spring yielding devices heretofore employed for a similar purpose.

Although I have shown and described certain preferred embodiments of my invention, it will be understood that I do not wish to be limited to the exact constructions shown and described, but that various changes and other modifications may be made without departing from the spirit and scope of my invention.

I claim as my invention:

1. A vibration damper for crank shafts comprising a hub member secured to the shaft and having a flange, an inertia member surrounding said hub member and having a flange, and a rubber element surrounding the hub member and forming the sole support for the inertia member thereon, said rubber element being permanently secured to both said flanges.

2. A vibration damper for crankshafts comprising a hub member secured to the shaft and having a radial flange, an inertia member surrounding said hub member and having a radial flange, and a rubber element surrounding the hub member and forming the sole support for the inertia member thereon, said rubber element extending axially between the flanges and radially between the members and being surface bonded to both members.

3. A vibration damper for crankshafts comprising a hub member secured to the shaft and having a radially disposed flange, an inertia member surrounding the hub member and having a radially disposed flange, and a rubber element connecting said hub and inertia members and extending between the flanges and between the flange on each member and the other member to afford the sole support for said inertia member on said hub member.

4. A vibration damper for crankshafts comprising a hub member secured to the shaft and having a radial flange, an inertia member surrounding said hub member and having a radial flange, and yielding intermediate driving means of rubber surrounding the hub member and forming the sole support against movement in any direction for the inertia member thereon, said intermediate driving means extending axially between the flanges and radially between the members and between at least one flange and the other member.

EARL G. GUNN.